United States Patent [19]
Richards

[11] Patent Number: 4,969,273

[45] Date of Patent: Nov. 13, 1990

[54] MARKING-OUT

[76] Inventor: Roger C. Richards, 8 Church Street, Amersham, Buckinghamshire, United Kingdom

[21] Appl. No.: 450,819

[22] Filed: Dec. 14, 1989

[30] Foreign Application Priority Data

Dec. 15, 1988 [GB] United Kingdom ................. 8829384

[51] Int. Cl.[5] ................................................ G01B 3/14

[52] U.S. Cl. ........................................ 33/613; 33/197; 33/667

[58] Field of Search ................. 33/197, 613, 666, 667, 33/562, 563, 528, 539, 644, 574, DIG. 10

[56] References Cited

U.S. PATENT DOCUMENTS

| | | | |
|---|---|---|---|
| 664,910 | 1/1901 | Voight | 33/197 |
| 2,862,302 | 12/1958 | Lucia . | |
| 3,126,776 | 3/1964 | Whistler et al. . | |
| 3,526,947 | 9/1970 | Pasek . | |
| 4,220,309 | 9/1980 | Eisen et al. . | |
| 4,345,381 | 8/1982 | Brislin . | |
| 4,372,050 | 2/1983 | Eisenhauer . | |
| 4,457,485 | 7/1984 | Landt et al. . | |

FOREIGN PATENT DOCUMENTS

| | | |
|---|---|---|
| 84/02103 | 6/1984 | European Pat. Off. . |
| 2135693 | 1/1973 | Fed. Rep. of Germany . |

*Primary Examiner*—Harry N. Haroian
*Attorney, Agent, or Firm*—William D. Hall

[57] ABSTRACT

A guiding pad for use in marking-out comprises a paper template 14 to one surface of one edge zone of which is adhered a foam plastics layer 6, upon the external surface of which is a medium tack adhesive layer 9 covered with a protective peel-off layer 10. On the other surface of the edge zone is a weaker adhesive layer 7 covered by a protective peel-off layer 8. One of the two surface portions of the template layer 14 not covered by adhesive have printed indications of an intended fold line of the layer 14 and of intended positions of striking plate screws of a magnetic latch, whilst the other of those two surface portions has printed indications of intended positions of latch body fixing screws and of a magnetically soft material rod.

15 Claims, 2 Drawing Sheets

MARKING-OUT

This invention relates to marking-out.

Various marking-out systems are known which make it possible to fix a position quickly and exactly when marking, particularly in locations which are not readily accessible. For example, WO84/02103 discloses a system in which a pad-form marker has two sides with differing degrees of adhesion. The differing degrees of adhesion are obtained by providing differing total areas of adhesive at the two sides or by providing at the two sides adhesives having differing adhesive properties. The marker comprises a fixing part consisting of a piece of double-sided adhesive tape, preferably of the foaming-tape kind, one face of which is covered by a permanent layer, such as a protective paper and the other face of which is covered by an easily removed protective layer, preferably siliconized foil. The permanent layer is formed with a hole therethrough to the adhesive on the one face of the fixing part. The area of adhesive exposed through the hole is smaller than the area of adhesive over the other face of the fixing part. An indicator in the form of a sight hole through the centre of the marker can be provided for accurate positioning, but other parts of the marker, such as outer edges, or outer corners, or some position mark on the marker, could instead be employed. The marker is used for marking a position, particularly in a location which is not readily accessible, such as on a wall, a cupboard door, or a chest, for example, when an object, for example a cupboard, an electrical installation fitting, or a handle, an intended position of which thereon is to be marked obscures the intended marking location. In use of the marker, it is disposed with its accurate position indicator aligned with, for example, a fixing hole in a cupboard rear surface and has its permanent layer pressed against the cupboard rear surface so that it sticks to the surface via the adhesive exposed through the hole in the permanent layer. The protective layer is then removed and the cupboard pressed at a desired location against a wall to which it is to be attached. The cupboard is then taken from the wall to leave the marker attached to the wall at the correct position for forming of a fixing bore, for example, to receive a screw passed through the fixing hole. The system is substantially the same when mounting a handle on a cupboard door using fixing screws screwed in from the inside of the door.

Such known systems are suitable for marking-out in relatively straightforward circumstances in which, for example, an article can be brought face-to-face to a fixing surface at which the article is to be fixed, but not for marking-out in more complicated circumstances.

According to one aspect of the present invention, there is provided a method of marking-out for an element to be disposed between first and second members, comprising adhering to the first member at a desired location on a surface of said first member a first portion of a first surface of a guiding device, refraining from adhering to said first member a second portion of said first surface, displacing one of the first and second members relatively towards the other and thereby bringing said first and second members into a desired positional relationship and adhering to a surface of said second member a first portion of a second surface of said guiding device opposite to said first surface, refraining from adhering to said second member a second portion of said second surface, and displacing one of said first and second members relatively away from the other leaving said first portion of said second surface adhered to said surface of said second member, said second portion of said second surface unadhered to said surface of said second member, and said second portion of said first surface as a guide.

According to another aspect of the present invention, there is provided a guiding device for use in marking-out, comprising a pad having adhesive on a first portion, but not on a second portion, of a first major surface thereof and on a first portion, but not on a second portion, of a second major surface thereof opposite to said first major surface, the adhesive on the second major surface thereof being more effective than the adhesive on the first major surface thereof, and said second portion of said first major surface serving as a guide.

Owing to the invention, it is possible to provide a guiding device suitable for more complicated circumstances in which, for example, the surface of the first member, when brought face-to-face with the surface of the second member, extends over only part, or even none, of a fixing zone for the element at the surface of the second member. It is also possible to minimize the relatively expensive adhesive portions of the first and second surfaces of the guiding device by maximizing relatively cheap non-adhesive portions of these two surfaces.

By arranging that the aforesaid second surface portions can be folded relatively to the aforesaid first surface portions, a surface of said first member or said second member adjacent to but inclined to the aforesaid surface of said first member or the aforesaid surface of said second member can be used as a fixing surface, with the appropriate second surface portion serving as a guide.

The or each second surface portion serving as a guide can be provided with one or more indicators, for example printed markings, for that purpose.

In order that the invention may be clearly understood and readily carried into effect, reference will now be made, by way of example, to the accompanying drawings, in which.

Figure 3:
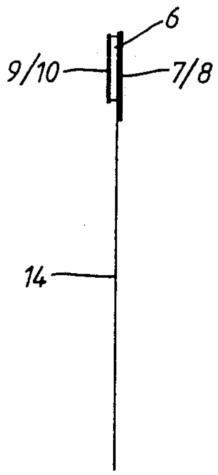
FIG. 3 shows a side elevation of the pad.
Figure 4:
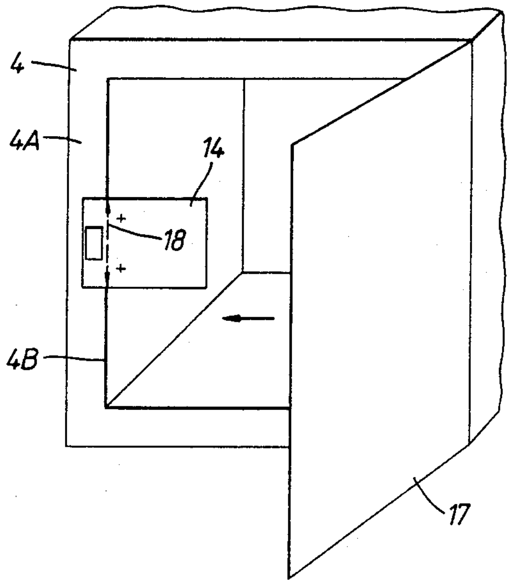
Figure 5:
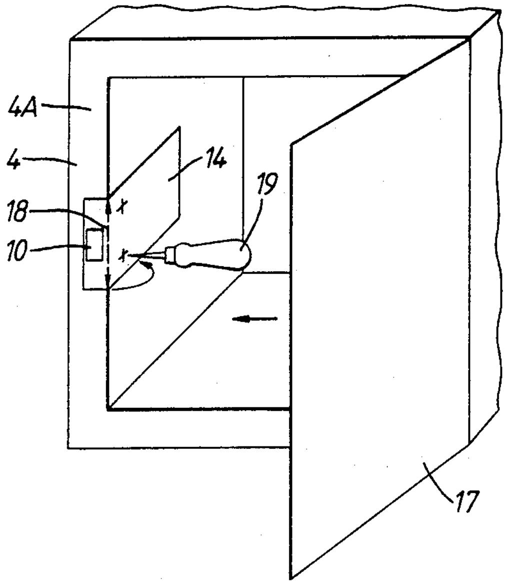
Figure 6:
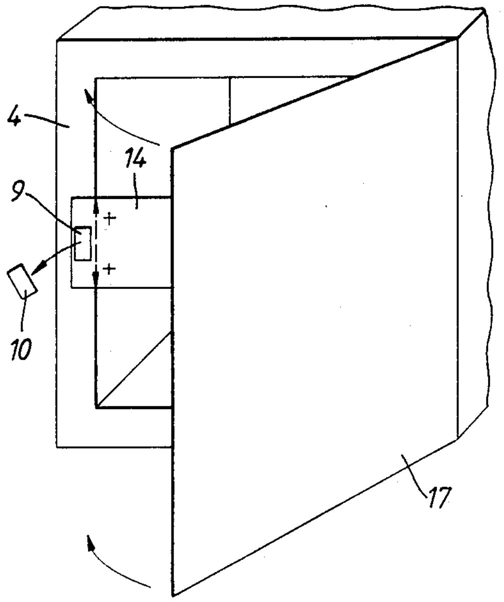
Figure 7:
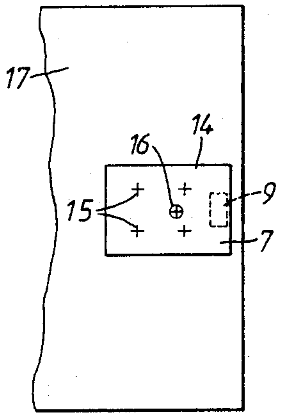

FIG. 4 shows a diagrammatic front perspective view of a cupboard to which a latch is to be fitted, and showing the pad of FIGS. 1 to 3 in an initial condition, FIG. 5 is a view similar to FIG. 4, but showing the pad in a later condition, FIG. 6 is a view similar to FIG. 5, but showing the pad in a yet later condition, FIG. 7 shows a rear elevation of a door of the cupboard of FIG. 6, but showing the pad in a yet still later condition.

The system described with reference to the drawings is particularly applicable to the fitting to a cupboard of a magnetically operable latch disclosed in my U.S. patent application Ser. No. 353,178, now U.S. Pat. No. 4,919,464 British Patent No. 2182713.

The pad comprises a foam plastics layer 6 with at one major side, a medium tack adhesive layer 9 and an exterior peel-off paper layer 10 on the layer 9. At the opposite major side of the layer 6 there is permanently adhered to the layer 6 a paper template layer 14 upon the outside of which is a weaker adhesive layer 7 and an exterior peel-off paper layer 8 on the layer 7. The adhesive of the layer 7 is relatively weaker than the medium tack adhesive of the layer 9. As seen in FIG. 1, at that major surface of the template layer 14 carrying the layers 7 and 8, and on that part of the template layer 14 beyond the layers 7 and 8 are printed four plain crosses 15 and a single, circled cross 16. The crosses 15 represent the centres for four screws used to fix the latch body to a door 17 of the cupboard 4, whilst the circled cross 16 represents the drilling centre for drilling a bore in the door to receive a magnetically soft material rod of the latch. As seen in FIG. 2, upon the opposite major surface of the template layer 14 are printed two plain crosses 17 and an arrowed chain line 18. The crosses 17 represent the centres for two screws for fixing a striking plate of the latch to a wooden side wall 4A of the cupboard 4, whilst the arrowed chain line 18 is a reference line to be aligned with the inner front edge 4B of that side wall.

Figure 1:
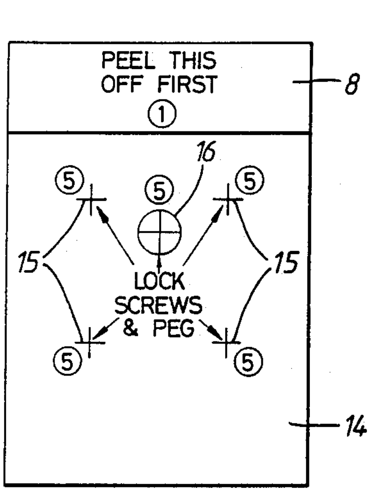
FIG. 1 shows a rear elevation of a guiding pad.
Figure 2:
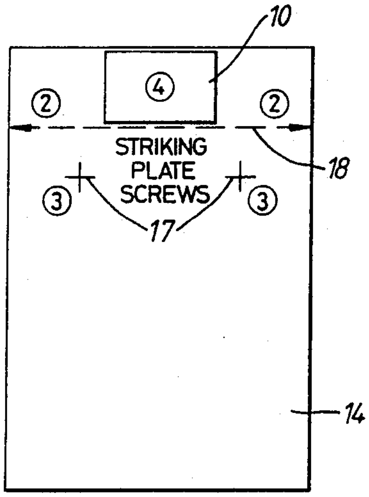
FIG. 2 shows a front elevation of the pad.

In employing the pad shown in FIGS. 1 to 3, the layer 8 is peeled-off off and the exposed layer 7 is applied to the relevant side wall 4A of the cupboard 4 in such manner that the line 18 is aligned with the inner edge 4B of that side wall, the layer 7 weakly adhering the pad to the front surface of the side wall 4A, as illustrated in FIG. 4. Then, as illustrated in FIG. 5, the template layer 14 is folded back about the line 18 and a bradawl 19 is applied centrally to the two crosses 17 in turn and pushed into the wooden side wall 4A to mark the centres for the two striking plate screws. Then the folded-back part of the template layer 14 is allowed to move forwards and the layer 10 is peeled-off to expose the adhesive layer 9, as shown in FIG. 6. Then the door 17 is closed and pressed against the pad, so that the stronger adhesive layer 9 adheres to the inside surface of the door. The door is then opened, so detaching the adhesive layer 7 from the side wall 4A, so that the pad is carried away by the opening door 17. With the pad in the condition shown in FIG. 7, a bradawl is applied at the four crosses 15 and at the circled cross 16 to mark the centres for the four body fixing screws and for the cylindrical bore for the rod.

I claim:

1. A method of marking-out for an element to be disposed between first and second members, comprising adhering to the first member at a desired location on a surface of said first member a first portion of a first surface of a guiding device, refraining from adhering to said first member a second portion of said first surface, displacing one of the first and second members relatively towards the other and thereby bringing said first and second members into a desired positional relationship and adhering to a surface of said second member a first portion of a second surface of said guiding device opposite to said first surface, such that the adherence between said guiding device and said second member is more effective than the adherence between said guiding device and said first member, refraining from adhering to said second member a second portion of said second surface, and displacing one of said first and second members relatively away from the other leaving said first portion of said second surface adhered to said surface of said second member, said second portion of said second surface unadhered to said surface of said second member, and said second portion of said first surface as a guide.

2. A method according to claim 1, and further comprising utilizing said second portion of said first surface as a guide in marking said second member at locations spaced from said first portion of said second surface while the latter portion is in a condition adhered to said surface of said second member.

3. A method according to claim 1, and further including, while one of the first portions is in an adhered condition, folding said second portions relative to said one of the first portions to bring one of said second portions face-to-face with a fixing surface inclined to the surface to which said one of the first portions is adhered.

4. A method according to claim 3, wherein said one of the first portions and said one of the second portions are of said first surface.

5. A method according to claim 1, wherein said first member is a door frame of said cupboard, said second member is a door of said cupboard, said surface of said first member is a forwardly-facing surface of said door frame, and said surface of said second member is a rearwardly-facing surface of said door.

6. A method according to claim 18, and further including, while said first portion of said first surface is in an adhered condition, folding said second portions relative to said first portion of said first surface to bring said second portion of said first surface face-to-face with a fixing surface inclined to the surface to which said first portion of said first surface is adhered, said fixing surface being an inside surface of said cupboard adjacent and inclined to said forwardly-facing surface.

7. A guiding device for use in marking-out, comprising a pad having adhesive on a first portion, but not on a second portion, of a first major surface thereof and on a first portion, but not on a second portion, of a second major surface thereof opposite to said first major surface, the adhesive on the second major surface thereof being more effective than the adhesive on the first major surface thereof, and said second portion of said first major surface serving as a guide.

8. A device according to claim 7, and further comprising guiding indications marked upon said second portion of said first major surface.

9. A device according to claim 8, and further comprising guiding indications marked upon said second portion of said second major surface.

10. A device according to claim 7, wherein the second portions are folded along a fold line relative to the first portions.

11. A device according to claim 10, and further comprising, at said second major surface, means indicating said fold line.

12. A device according to claim 7, wherein said pad comprises a layer of elastomeric foam material.

13. A device according to claim 7, wherein said pad comprises a template layer of non-adhesive material providing the second portions, and adhesive layers at respective opposite sides of a edge zone of said template layer and providing the first portions.

14. A device according to claim 13, wherein said adhesive layers are covered externally by respective protective, peelable layers.

15. A device according to claim 13 wherein said layer of elastomeric foam material is disposed between one of said adhesive layers and said edge zone and is adhered to said edge zone.

* * * * *